United States Patent
Leistert et al.

(10) Patent No.: US 11,703,073 B2
(45) Date of Patent: Jul. 18, 2023

(54) CONNECTION BOLT FOR TOOL-FREE BUTT-JOINING OF TWO FURNITURE PANELS

(71) Applicant: Haefele Berlin GmbH & Co KG, Berlin (DE)

(72) Inventors: Peer Leistert, Schoeneiche (DE); Lorenz Arnold, Unteraegeri (CH)

(73) Assignee: Haefele Berlin GmbH & Co KG, Berlin (DE)

( * ) Notice: Subject to any disclaimer, the term of this patent is extended or adjusted under 35 U.S.C. 154(b) by 204 days.

(21) Appl. No.: 17/302,421

(22) Filed: May 3, 2021

(65) Prior Publication Data

US 2021/0254648 A1    Aug. 19, 2021

Related U.S. Application Data

(63) Continuation of application No. PCT/EP2019/078800, filed on Oct. 23, 2019.

(30) Foreign Application Priority Data

Nov. 5, 2018    (DE) .................... 20 2018 106 278.6

(51) Int. Cl.
    *F16B 12/24*      (2006.01)
    *F16B 5/00*      (2006.01)
    *F16B 19/02*      (2006.01)

(52) U.S. Cl.
    CPC .............. *F16B 12/24* (2013.01); *F16B 5/008* (2013.01); *F16B 19/02* (2013.01)

(58) Field of Classification Search
CPC ...... F16B 12/24; F16B 12/42; F16B 12/2009; A47B 88/00; A47B 95/00
See application file for complete search history.

(56) References Cited

U.S. PATENT DOCUMENTS

| | | | |
|---|---|---|---|
| 2,379,752 | A | 7/1945 | Schultz |
| 4,984,929 | A | 1/1991 | Roeck |
| 5,607,271 | A | 3/1997 | Salice |
| 5,647,711 | A | 7/1997 | Berger |
| 8,079,794 | B2 | 12/2011 | Schael et al. |
| 8,408,854 | B2 | 4/2013 | Schael et al. |

(Continued)

FOREIGN PATENT DOCUMENTS

| | | |
|---|---|---|
| DE | 25 46 364 A1 | 4/1977 |
| DE | 25 57 966 A1 | 6/1977 |
| DE | 0 274 683 A1 | 7/1988 |

(Continued)

OTHER PUBLICATIONS

Machine Translation of DE 29507834. Generated Jan. 17, 2023. worldwide.espacenet.com. 7 pgs.*

*Primary Examiner* — Daniel J Wiley
(74) *Attorney, Agent, or Firm* — Orbit IP

(57) ABSTRACT

A connection bolt for connecting two parts, in particular furniture panels, includes a cylindrical bolt shaft for anchoring in a bore of the one part and a bolt head for anchoring in a bore of the other part. The bolt head has a foot portion, which adjoins the bolt shaft, and a hook-shaped head portion with a radially outwardly projecting, blade-shaped projection. The foot portion is arranged with respect to the bolt shaft eccentrically offset in the radial direction in which the projection projects radially outwards.

20 Claims, 2 Drawing Sheets

(56) References Cited

U.S. PATENT DOCUMENTS 10,844,892 B2     11/2020  Matzler
2021/0254648 A1    8/2021  Leistert et al.

FOREIGN PATENT DOCUMENTS

| DE | 40 17 515 A1 | 12/1991 | | |
|---|---|---|---|---|
| DE | 295 07 834 U1 | 7/1995 | | |
| DE | 198 30 740 A1 | 1/2000 | | |
| DE | 203 00 574 U1 | 5/2004 | | |
| DE | 20 2012 012 030 U1 | 4/2014 | | |
| DE | 10 2014 009 257 A1 | 1/2016 | | |
| DE | 20 2015 008 847 U1 | 5/2017 | | |
| DE | 20 2018 1 06 278 U1 | 11/2018 | | |
| EP | 0 274 683 A1 | 7/1988 | | |
| GB | 2256894 A | * | 12/1992 | ......... A47B 88/0014 |
| RU | 2423626 C2 | 7/2011 | | |
| SU | 1449716 A1 | 1/1989 | | |

* cited by examiner

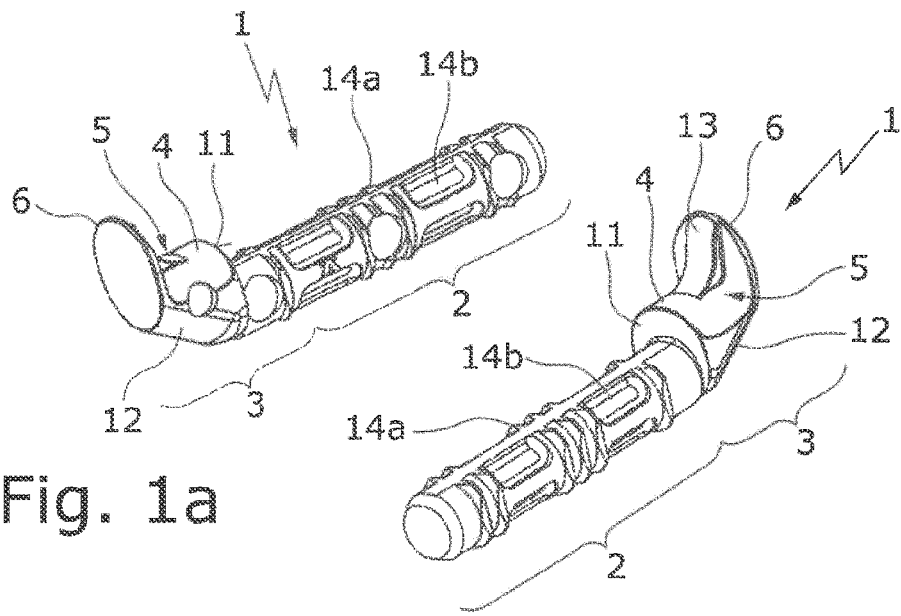
Fig. 1a
Fig. 1b
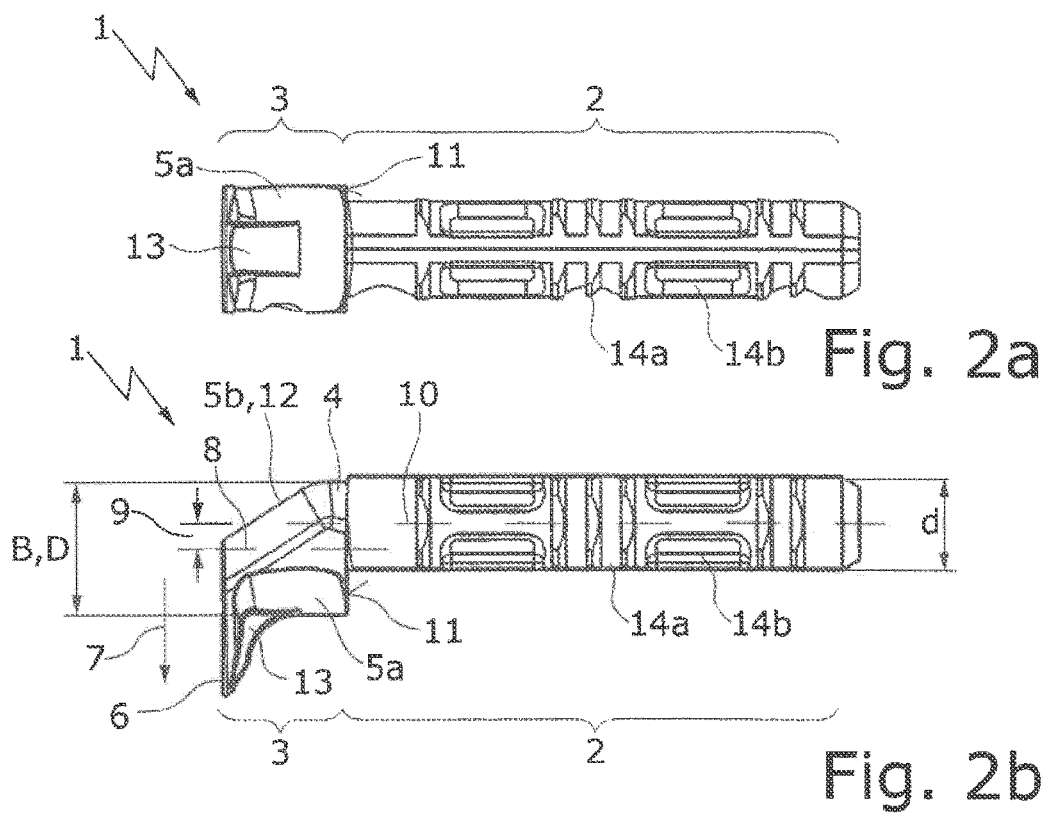
Fig. 2a
Fig. 2b

CONNECTION BOLT FOR TOOL-FREE BUTT-JOINING OF TWO FURNITURE PANELS

CROSS-REFERENCE TO RELATED APPLICATIONS

This continuation application claims priority to PCT/EP2019/078800 filed on Oct. 23, 2019, which has published as WO 2020/094394 A1 and also the German application number 20 2018 106 278.6 filed on Nov. 5, 2018, the entire contents of which are fully incorporated herein with these references.

DESCRIPTION

Field of the Invention

The invention relates to a connection bolt ("connection fitting") for connecting two parts, in particular two furniture panels, comprising a cylindrical bolt shaft for anchoring in a bore of the one part and comprising a bolt head for anchoring in a bore of the other part, wherein the bolt head has a foot portion, which adjoins the bolt shaft, and a hook-shaped head portion with a radially outwardly projecting, blade-shaped projection. The connection bolt is particularly suitable for parts made of chipboard, MDF or wood-like materials.

Background of the Invention

Such a connection bolt has been disclosed by DE 295 07 834 U1, for example. The known connection bolt is screwed by way of its bolt shaft, which is provided with a thread, into a bore of a first part, and then the bolt head is pivoted by way of its blade-shaped projection into the bore of the second part made of wood-based material, as a result of which the projection penetrates into the bore wall of the second part, and the connection bolt is anchored in the bore.

However, a problem with such butt-connections is that a gap formation can occur between the parts to be connected, and also a clearance can remain between the butt-jointed part and the bore wall ("unclean hole covering"). The cause for this is that the axis of rotation of the pivoting-in movement has to be located directly at the bore edge, and this is realized in known applications by a notched beveling of the abutment surface of the first part in this region such that said first part can be set obliquely. Concealing the gap and covering the visible bore then occur subsequently by tightening a thread (DE 295 07 834 U1), sliding over a sleeve (DE 203 00 574 U1), or similar aids.

SUMMARY OF THE INVENTION

The object on which the present invention is based is that of developing a connection bolt of the type stated at the outset to the effect that a gap-free and clearance-free connection between two parts to be connected can be achieved. It is also intended for the connection to be improved in terms of stability, dimensional stability, aesthetic value of the appearance, etc.

This object is achieved according to the invention in that the foot portion is arranged with respect to the bolt shaft eccentrically offset in the radial direction in which the projection projects outwards.

According to the invention, the axial offset of the bolt head with respect to the bolt shaft brings about a function-determining displacement of the axis of rotation during the pivoting-in movement of the first part, as a result of which the axis of rotation, which is defined by the bearing edge of the obliquely set first part, is located directly at the bore edge of the second part.

In an advantageous embodiment of the invention, the foot portion, as viewed in the radial direction in which the projection projects outward, has a width which is larger than the shaft diameter. The end face of the foot portion thus present at the transition to the bolt shaft constitutes a depth stop for the first part. In the case of a circular cylindrical foot portion, the diameter of the foot portion is larger than the shaft diameter.

The rear side of the head portion opposite to the projection is preferably formed as an oblique surface running obliquely with respect to the bolt shaft or as a half-cone in order to allow the bolt head to be pivoted into the bore of the second part in a clearance-free manner.

The projection and the front side of the head portion facing the projection are preferably connected to one another by a web or a ramp so as to additionally support the projection and secure against plastic deformation. Here, the web can particularly advantageously have a concave outer contour which, during the pivoting-in movement, leads to material compression in the second part and draws the bolt head further into the bore of the second part.

For secure anchoring in the bore of the first part, the bolt shaft can have on its lateral side a barb-like clamping structure, in particular in the form of clamping noses or clamping grooves. The clamping grooves, which are grooved like barbs, prevent the bolt shaft from being pulled out of the bore of the first part and are arranged in such a way that they grip along the parts (no split risk).

The invention also relates to an assembly comprising two parts which are connected to one another in a tool-free manner by means of the connection bolt according to the invention, wherein the bolt shaft of the connection bolt is anchored in a bore of the one, first part, and the bolt head is pivoted into a bore of the other, second part and engages by way of its projection into the bore wall of the second part. The second part is formed from such a material that the projection can penetrate into the material, with the material preferably consisting of wood-based material or wood-like material (chipboard or MDF materials). The two parts can for example be two panels, in particular furniture panels, or panel material of furniture components which are fastened to one another at a right angle.

By hammering or screwing the bolt shaft into the end-side bore of the first panel, said bolt shaft is firmly seated in the first panel. Obliquely inserting the bolt head into the bore of the second panel and then pivoting in the bolt head causes the projection of the bolt head to dig into the bore wall, as a result of which the bolt head is also anchored in the bore of the second panel. The axis of rotation when pivoting-in is defined by the edge of the first panel by which the obliquely set first panel bears against the second panel. Here, the axial offset is chosen as far as possible in such a way that the radially leading edge of the bolt head is offset inwardly with respect to the bearing edge of the obliquely set first panel, and this bearing edge thus overlaps the bore edge in the end position.

Further advantages of the invention will emerge from the description, the claims and the drawing. Likewise, the features stated above and those still to be specified can be used each on their own account or multiply in any desired combinations. The embodiments which are shown and described are not to be understood as an exhaustive list, but rather have an exemplary character for describing the invention.

BRIEF DESCRIPTION OF THE DRAWINGS

In the drawings:

FIGS. 1a, 1b show two different perspective views of the connection bolt according to the invention;

FIGS. 2a, 2b show two different side views of the connection bolt according to the invention.

DETAILED DESCRIPTION OF THE PREFERRED EMBODIMENTS

Figure 3A:
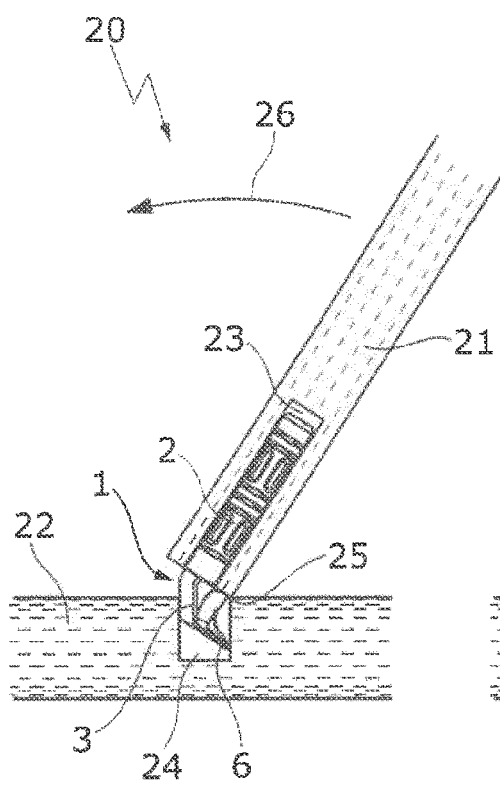
FIGS. 3a, 3b show two furniture panels connected to one another by means of the connection fitting according to the invention, in the not yet connected state (FIG. 3a) and in the connected state (FIG. 3b).

The connection bolt ("connector") 1 shown in FIGS. 1, 2 serves for connecting two furniture panels and is manufactured in one piece from metal or plastic.

The connection fitting 1 comprises a circular cylindrical bolt shaft 2 and a bolt head 3. The bolt head 3 has a foot portion 4, which adjoins the bolt shaft 2, and a hook-shaped head portion 5 with a radially outwardly projecting, blade-shaped projection 6.

The foot portion 4 is arranged with respect to the bolt shaft 2 eccentrically offset in the radial direction 7 in which the projection 6 projects radially outwards, that is to say that the axis 8 of the foot portion 4 has in this direction 7 an axial offset 9 with respect to the shaft axis 10. As viewed in the radial direction 7, the width B of the foot portion 4 or, in the case of a circular cylindrical foot portion 4, its diameter D is larger than the shaft diameter d, as a result of which the foot portion 4 has a sickle-shaped end face 11 at its transition to the bolt shaft 2.

The rear side 5b of the head portion 5 opposite to the projection 6 is formed as an oblique surface 12 running obliquely with respect to the shaft axis 10. Alternatively, this rear side 5b can also be configured as a half-cone which tapers in the direction of the free head end. The projection 6 and the front side 5a of the head portion 5 facing the projection 6 are additionally connected to one another by a web (ramp) 13 having a concave outer contour, as a result of which the projection 6 is additionally supported and protected against plastic deformation.

The bolt shaft 2 has on its lateral side a barb-like clamping structure which acts in the direction towards the bolt head 3 and which is in the form of an alternating arrangement of a plurality of clamping noses or clamping recesses 14a, 14b which extend axially and in the circumferential direction, wherein at least the clamping noses 14a extending in the circumferential direction project beyond the lateral surface of the bolt shaft 2.

Figure 3B:
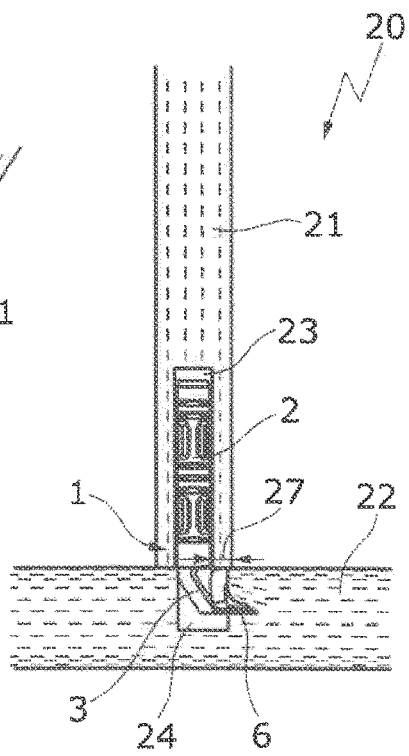

FIGS. 3a, 3b show a furniture assembly 20 comprising two panels 21, 22 and the connection bolt 1. The bolt shaft 2 is anchored in an end-side bore 23 of the first panel 21 by being hammered in, screwed in or incorporated by adhesive bonding, with the first panel 21 bearing against the end face 11 of the foot portion 4. As shown in FIG. 3a, setting the first panel 21 obliquely causes the bolt head 3 to be introduced into a bore 24 of the panel side of the second panel 22 until the first panel 21 has its panel edge 25 seated on the second panel 22. The diameter of the cylindrical foot portion 4 ideally corresponds to the diameter of the bore 24.

Subsequently tilting the first panel 21 in the direction 26 causes the bolt head 3 to pivot completely into the bore 24, and the projection 6 of the bolt head 3 digs into the bore wall (FIG. 3b), as a result of which the bolt head 3 is anchored in the bore 24. Here, the first panel 21 constitutes a lever extension such that the projection 6 is pressed with correspondingly high force into the bore wall. The axis of rotation when pivoting-in is defined by the panel edge 25 which bears against the second panel 22 and which, by virtue of the axial offset 9, is located directly at the bore edge of the second panel 22. Here, the axial offset 9 corresponds to the wall thickness 27 of the first panel 21 remaining between the end-side bore 23 and the panel outer side, with the result that there is neither the occurrence of a gap between the two panels 21, 22 nor of a clearance between the bolt head 3 and the bore wall of the bore 24. The panel edge 25 (=axis of rotation) of the first panel 21 is offset slightly outward with respect to the edge of the foot portion 4. This offset, which is approximately 0.5 mm, allows the subsequent covering of the bore 24 since the foot portion 4 is supported against the tightly compressed cover layer in the bore 24. The two panels 21, 22 are then connected to one another at a right angle. The connection becomes stable only when the right angularity of the two panels 21, 22 in the overall assembly is fixed.

When pivoting the bolt head 3 into the bore 24, the web 13 prevents the projection 9 from bending and, by virtue of its concave outer contour, compresses the material gripped from behind, thereby producing a spring-back action and imparting tension and compression to the connection. During further working or during transportation, there is no weaking of the connection because it is sprung. The springing compensates for the movement tolerances by contrast with a screw.

What is claimed is:

1. A connection bolt for connecting a first part and a second part, comprising:
   a cylindrical bolt shaft for anchoring in a bore of the first part and comprising a bolt head for anchoring in a bore of the second part;
   wherein the bolt head has a foot portion, which adjoins the bolt shaft, and a hook-shaped head portion with a radially outwardly projecting, blade-shaped projection;
   wherein a rear side of the head portion opposite to the projection is formed as an oblique surface which runs obliquely with respect to the bolt shaft, or as a half-cone, wherein the oblique surface does not extend beyond an outer diameter of the bolt shaft;
   wherein the foot portion is arranged with respect to the bolt shaft eccentrically offset in a radial direction in which the projection opposite the oblique surface or the half-cone projects radially outwards, and/or in that the projection and a front side of the head portion that faces the projection are connected to one another by a web having a concave outer contour.

2. The connection bolt as claimed in claim 1, wherein, as viewed in the radial direction in which the projection projects outwards, the foot portion has a width which is larger than a shaft diameter.

3. The connection bolt as claimed in claim 2, wherein the foot portion is of cylindrical form.

4. The connection bolt as claimed in claim 3, wherein the diameter (D) of the foot portion is larger than the shaft diameter (d).

5. The connection bolt as claimed in claim 4, wherein the bolt shaft has on its lateral side a clamping structure, being in the form of clamping noses or clamping grooves.

6. The connection bolt as claimed in claim 3, wherein the bolt shaft has on its lateral side a clamping structure, being in the form of clamping noses or clamping grooves.

7. The connection bolt as claimed in claim 2, wherein the bolt shaft has on its lateral side a clamping structure, being in the form of clamping noses or clamping grooves.

8. The connection bolt as claimed in claim 1, wherein the foot portion is of cylindrical form.

9. The connection bolt as claimed in claim 8, wherein the bolt shaft has on its lateral side a clamping structure, being in the form of clamping noses or clamping grooves.

10. The connection bolt as claimed in claim 1, wherein the bolt shaft has on its lateral side a clamping structure, being in the form of clamping noses or clamping grooves.

11. An assembly comprising the first and second parts which are connected to one another by means of the connection bolt as claimed in claim 1, wherein the bolt shaft of the connection bolt is anchored in a bore of the first part, and the bolt head is pivoted into a bore of the second part and engages by way of its projection into a bore wall of the second part.

12. The assembly as claimed in claim 11, wherein an axial offset between the foot portion and the bolt shaft corresponds to a wall thickness remaining between the bore of the first part and an outer side of the first part.

13. The assembly as claimed in claim 12, wherein the first and second parts bear against one another in a gap-free manner.

14. The assembly as claimed in claim 13, wherein the foot portion of the bolt head is received in the bore of the second part in a clearance-free manner.

15. The assembly as claimed in claim 12, wherein the foot portion of the bolt head is received in the bore of the second part in a clearance-free manner.

16. The assembly as claimed in claim 11, wherein the first and second parts bear against one another in a gap-free manner.

17. The assembly as claimed in claim 16, wherein the foot portion of the bolt head is received in the bore of the second part in a clearance-free manner.

18. The assembly as claimed in claim 11, wherein the foot portion of the bolt head is received in the bore of the second part in a clearance-free manner.

19. The assembly as claimed in claim 11, wherein the first part and the second part are furniture panels.

20. A connection bolt configured for connecting a first part and a second part, comprising:
- a cylindrical bolt shaft for anchoring in a bore of the first part and comprising a bolt head adjoining the bolt shaft for anchoring in a bore of the second part;
- wherein the bolt head defines a front side opposite a rear side;
- wherein the front side of the bolt head includes a hook-shaped head portion with a radially outwardly projecting, blade-shaped projection that extends beyond an outer diameter of the bolt shaft;
- wherein the rear side of the bolt head comprises an oblique surface which runs obliquely with respect to the bolt shaft, or as a half-cone, wherein the oblique surface does not extend beyond the outer diameter of the cylindrical bolt shaft.

* * * * *